United States Patent Office 2,863,875
Patented Dec. 9, 1958

2,863,875
PROCESS FOR THE PRODUCTION OF BASIC DYESTUFFS

Berthold Bienert and Fritz Baumann, Leverkusen-Bayerwerk, Germany, assignors to Farbenfabriken Bayer Aktiengesellschaft, Leverkusen, Germany, a corporation of Germany No Drawing. Application December 16, 1954
Serial No. 475,821

Claims priority, application Germany December 21, 1953

6 Claims. (Cl. 260—314.5)

This invention relates to new basic dyestuffs and to a process of making the same.

It is an object of the present invention to provide new basic dyestuffs of the general formula

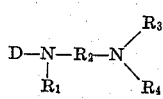

wherein D is a dyestuff radical, $R_1$ is hydrogen or a monovalent radical, $R_2$ is a bivalent radical, $R_3$ and $R_4$ are monovalent radicals. Another object is to provide new dyestuffs for the dyeing of the most varied raw materials such as cotton, wool, cellulose, polyamides, polyacryls, paper and paper raw materials. Still another object is to provide dyestuffs for the coloring of plastics, varnishes etc. Further objects will appear hereinafter.

In accordance with the present invention new basic dyestuffs are obtained by reacting a dyestuff containing an interchangeable halogen atom with an aliphatic tertiary amine containing in addition to the tertiary amino group at least one amino or imino group.

In a specific embodiment of the process of the invention the dyestuff containing an interchangeable halogen atom is reacted with an aliphatic primary or secondary amine containing a halogen atom. In this reaction a halogen compound is obtained which is subsequently reacted with a secondary amine. The reaction underlying this embodiment of the process of the invention may be illustrated by the following equation:

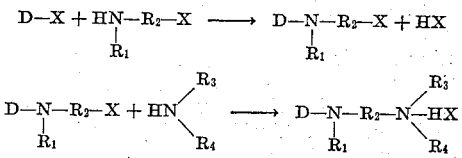

wherein D is a dyestuff radical, $R_1$ is dydrogen or a monovalent radical, $R_2$ is a bivalent radical, $R_3$ and $R_4$ are monovalent radicals and X is a halogen.

Instead of the ready dyestuffs, dyestuff intermediates containing an interchangeable halogen atom may be used which upon completion of the above reactions with either a tertiary amine or a halogen amine and a secondary amine are converted to the final dyestuff.

Dyestuff derivatives containing interchangeable halogen which are suitable as starting materials for the process of the invention, include, inter alia, anthraquinone, phthalocyanine, triphenyl methane, cyanine, oxazine and azo dyestuffs, containing carboxylic acid halide, or sulfonic acid halide groups, or halogen alkyl groups, such as ω-chloromethyl.

Suitable aliphatic tertiary amines containing free amino or imino groups are for example 1-amino-2-dimethylamino-ethane, 1-amino-3-dimethylamino-propane, 1-diethylamino-4-amino-n-pentane or methylamino acetic acid-1-diethylamino-4-pentyl amide.

As aliphatic primary or secondary amines containing halogen atoms there may be used β-chloro-ethylamine, β-γ-dibromopropyl amine, 1-amino-4-chloro butane, β,β-dichloro-diethylamine etc.

Among the secondary amines, which may be used in the second step of the specific embodiment of the invention, are all common secondary amines, as for example dimethyl amine, diethyl amine, diethanol amine, piperidine, pyrrolidine and pyrroline.

As reaction medium may be used an excess of the organic base employed in the reaction or an inert organic solvent, such as benzene or acetone. In many cases it will be of advantage to carry out the reaction in an aqueous suspension.

The hydrogen halide set free in the reaction may be bound by an excess of the base applied in the process or by other acid binding agents added to the reaction mixture, such as alkali carbonate, sodium hydroxide or sodium bicarbonate.

If the reaction is carried out in an aqueous suspension it may be of advantage to add a catalytic amount of pyridine. In that case, the reaction proceeds more quickly.

Temperatures of 0–100° C. have proven to be advantageous to obtain the best results.

In practising the process of the invention the halogen containing dyestuff, as for example copperphthalocyanine-(3)-di-trisulfochloride, is brought together with the amine, as for example 1-amino-2-dimethylamino ethane while stirring. As reaction medium there may be used water, an inert organic solvent or surplus organic base. Preferably, the reaction mixture is stirred for some hours at room temperature while the basic dyestuff formed is precipitating. To complete the reaction the mixture may be heated for a short time to 60–100° C. The basic dyestuff formed may be recovered from the reaction mixture by filtration.

Some of the basic dyestuffs obtainable by the process of this invention are soluble in organic solvents, such as ethyl alcohol, benzyl alcohol, esters, aromatic hydrocarbons, dimethyl formamide etc., and may be used for dyeing plastics and varnishes or in the offset printing.

The high affinity of the new basic dyestuffs to fibers derived from various raw materials makes the same, especially in form of their water soluble salts, extremely suitable for the dyeing of cotton, wool, cellulose, regenerated cellulose, fibers of polyamides or polyacryl nitrile, paper or paper raw materials as paper pulp etc. The basic dyestuffs go on these materials very easily from a dilute acid solution and the resulting dyeings show an extremely good wet fastness.

It is very surprising that even dyestuffs of high molecular weight will become well soluble in dilute acids such as acetic acid, if at least one tertiary amino group is introduced into the molecule.

The following examples, in which all parts are by weight, are for the purpose of illustrating the invention without in any way limiting it.

Example 1

13, 12 parts of a dyestuff having the formula

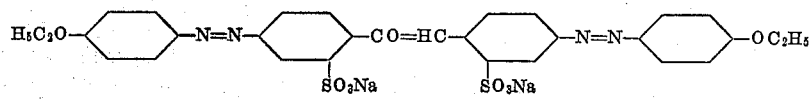

are reacted with 22 parts of phosphorous pentachloride in 33.5 parts of phosphorous oxychloride to obtain the sulfonyl chloride of the above azo dyestuff. The reaction mixture is diluted with acetone, the precipitated sulfonyl chloride filtered off, washed with gasoline and dried. The dry sulfonyl chloride is ground and then added to a mixture of 17.4 parts of 1-diethylamino-4-amino-n-pentane and 26.0 parts of water. This mixture is stirred for 12 hours at room temperature and then for one hour at 80° C. The basic dyestuff formed in good yield is filtered off with suction and washed with hot water. It may be used directly as a paste and is readily soluble in dilute acetic acid with yellow color.

*Example 2*

Following the procedure of Example 1, 10.9 parts of a dyestuff having the formula

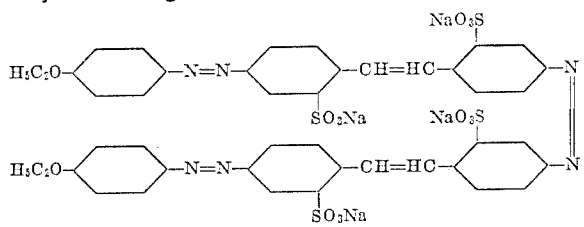

are used instead of the azo dyestuff of Example 1. The basic dyestuff formed is obtained in good yield and is readily soluble in dilute acetic acid with orange color.

If the reaction of Examples 1 and 2 is carried out with equivalent amounts of the sodium salt of 4,4'-dibenzoylamino stilbene-2,2'-disulfonic acid instead of the azo dyestuffs used in Examples 1 and 2, practically colorless basic substances are obtained which dissolve very readily in acetic acid.

*Example 3*

To the solution of 18.55 parts of 4-nitrobenzoylchloride in 29.3 parts of acetone a mixture of 31.2 parts of 1-diethylamino-4-amino-n-pentane in 49.0 parts of acetone are added slowly while stirring and cooling. Stirring is continued until a sample is readily soluble in dilute acetic acid. Thereafter the acetone is distilled off in vacuo and the residue is mixed with water of 40° C. Thereby an oil is formed which is extracted with benzene. The benzene solution is washed with water and dried with anhydrous sodium salt. Thereafter the benzene is removed in vacuo.

13.05 parts of the 4-nitrobenzene-5'-diethylamino-n-2'-pentylamide thus obtained are suspended in 52 parts of water and 25.25 parts of glacial acetic acid and then reduced with 11.65 parts of zinc dust at a temperature of 0–10° C. The solid parts are filtered off and the aniline derivative formed is diazotized by adding 25 parts of a 10% solution of sodium nitrite and 36 parts of concentrated hydrochloric acid. The solution is filtered and added slowly to a solution of 6.5 parts of 2-oxynaphthalene in 35 parts of pyridine, 234 parts of water and 74 parts of a 45% solution of sodium hydroxide. The mixture is stirred for two hours, the basic dyestuff formed is filtered off together with precipitated zinc hydroxide, washed with water and dried. The dyestuff is extracted with benzene and may be obtained from this solution by concentrating and addition of ligroin. It is soluble in dilute acetic acid with orange-yellow color.

*Example 4*

To a solution of 10 parts of 1,4-di-p-toluido-anthraquinone in 100 parts of chlorosulfonic acid 25.5 parts of thionyl chloride are dropwise added at a temperature of 75–80° C. while stirring. Stirring is continued at the same temperature for about two hours until a sample is insoluble in a mixture of diethylamine and water. The reaction mixture is allowed to cool and then added to a mixture of ice and sodium salt. The precipitated sulfochloride is filtered off with suction, washed with icy sodium salt solution and ice water. The paste of the sulfochloride is added to a solution of 45.2 parts of 1-diethylamino-4-amino-n-pentane and 90 parts of water while stirring and stirring is continued for 12 hours. Thereafter the reaction mixture is heated for half an hour to 80° C. The precipitated dyestuff is separated from the mother liquor and ground with water. It is then sucked off and washed with water until the filtrate is colorless. The basic dyestuff obtained is readily soluble in dilute acetic acid with greyish-green color.

*Example 5*

To a solution of 20 parts of 4-p-toluido-n-methyl-anthrapyrimidone in 200 parts of chlorosulfonic acid 34.3 parts of thionyl chloride are dropwise added at a temperature of 20–25° C. while stirring. Stirring is continued at room temperature until a sample is insoluble in diethyl amine water. The reaction mixture is poured onto a mixture of ice and sodiumchloride, the precipitated sulfochloride filtered off and washed with icy dilute sodium salt solution to neutral reaction. The paste obtained is added to a solution of 33.4 parts of 1-amino-3-dimethylaminopropane in 60 parts of water and stirred for 12 hours. Thereafter it is heated for half an hour to 70–80° C. The precipitated dyestuff is filtered off and washed with water. It dissolves in dilute acetic acid with bluish red color.

A similar dyestuff may be obtained by using 1-diethylamino-4-amino-n-pentane instead of 1-amino-3-dimethylaminopropane.

*Example 6*

To a solution of 10 parts of copperphthalocyanine in 100 parts of chlorosulfonic acid 21 parts of thionylchloride are slowly added at a temperature of 60–70° C. The reaction mixture is then heated for 4–5 hours to 112–113° C. until a sample is soluble in a 10 percent solution of pyridine and is insoluble in diethylamine water. The reaction mixture is cooled and poured onto ice. The precipitated copperphthalocyanine - (3) - ditrisulfochloride is filtered off with suction and washed with ice water to neutral reaction.

The paste of the sulfochloride thus obtained is added to a solution of 10.72 parts of 1-amino-2-dimethylamino ethane in 38.5 parts of water, stirred for 12 hours at room temperature and then for one hour at 60° C. The basic dyestuff formed is filtered off and washed with hot water. It dissolves in dilute acetic acid with clear greenish-blue color.

By using the nickel phthalocyanine instead of the copperphthalocyanine a dyestuff is formed which is soluble in dilute acetic acid with a more greenish-blue color. (To obtain the sulfochloride of the nickel phthalocyanine the reaction mixture has to be heated for 5 hours to 117–118° C.).

Instead of the 1-amino-2-dimethylamino ethane there may be used equimolecular amounts of 1-amino-3-dimethyl-amino-propane, 1-diethylamino-4-amino-n-pentane, methylamino acetic acid-1-diethylamino-4-n-pentylamide. The basic dyestuffs obtained are soluble in dilute acetic acid with clear greenish-blue color.

*Example 7*

To a solution of 9.96 parts of the sodium salt of copperphthalocyanine-4,4'disulfonic acid (obtained by reaction of two mols of phthalic acid anhydride and two mols of the sodium salt of 4-sulfophthalic acid in a urea melt) in 100 parts of chlorosulfonic acid 6.2 parts of thionylchloride are dropwise added at a temperature of 60–70° C. while stirring. Stirring is continued at a temperature of 75–80° C. until a sample is insoluble in diethylamine water. Then the reaction mixture is cooled and poured on ice. The precipitated sulfochloride is filtered off and washed to neutral reaction. It is added to a solution of 7.84 parts of 1-amino-3-dimethylaminopropane in 8 parts of water while stirring. Following the procedure of Example 6 a clear reddish-blue basic dyestuff is obtained which is readily soluble in dilute acetic acid.

A similar dyestuff may be obtained by using 1-amino-2-dimethylamino ethane as basic compound.

Example 8

To the solution of 10 parts of the sodium salt of 3,3'-diaza-copperphthalocyanine-4,4'-disulfonic acid (obtained by reaction of two mols of pyridine-2,3-dicarboxylic acid and two mols of the sodium salt of 4-sulfophthalic acid in a urea melt) in 150 parts of chlorosulfonic acid 12.4 parts of thionychloride are dropwise added at a temperature of 60–70° C. while stirring. Stirring is continued for 8 hours at 75–80° C. until a sample is insoluble in diethylamine water. Upon cooling the reaction mixture is poured on a mixture of ice and sodium salt soluiton. The precipitated sulfochloride is sucked off, mixed with icy sodium salt solution and neutralized with soda solution. Thereafter 32 parts of 1-diethylamino-4-amino-n-pentane are added. By following the procedure of Example 6 a reddish-blue basic dyestuff is obtained which is readily soluble in dilute acetic acid.

Example 9

To a solution of 14.3 parts of hte sodium salt of 4,4'-diphenyl-copperphthalocyanine-4'',4'''-disulfonic acid (obtained by the reaction of two mols of diphenyl-3,4-dicarboxylic acid and two mols of the sodium salt of 4-sulfophthalic acid in a urea melt) in 100 parts of chlorosulfonic acid 24.9 parts of thionyl chloride are dropwise added at a temperature of 60–70° C. while stirring. Stirring is continued for about 20 minutes at 110° C. until a sample is insoluble in diethylamine water. The reaction mixture is cooled, poured onto ice and the precipitated sulfochloride is filtered off with suction and washed with ice water to neutral reaction. The paste obtained is added to a mixture of 19 parts of water, 7.6 parts of sodium bicarbonate and 9.5 parts of 1-amino-3-dimethylamino-propane and stirred for 12 hours at room temperature and for half an hour at 80° C. The precipitated basic dyestuff is filtered off and washed with hot water. It is obtained in nearly quantitative yield and dissolves in dilute acetic acid with bluish-green color.

Example 10

To a solution of 10 parts of 4,4',4'',4'''-tetraphenyl-copperphthalocyanine in 100 parts of chlorosulfonic acid 5.5 parts of thionylchloride are dropwise added at 20–25° C. while stirring. Stirring is continued for 12 hours at room temperature. The reaction mixture is cooled and poured on ice. The precipitated sulfochloride is sucked off and washed with ice water to neutral reaction. The paste obtained is added to 21.8 parts of diethylamino-4-amino-n-pentane and stirred for 12 hours at room temperature and thereafter for one hour at 60° C. The basic dyestuff obtained in good yield is filtered off and washed with water. It dissolves in dilute acetic acid with clear green color.

Example 11

To a solution of 30.4 parts of the sodium salt of cobaltphthalocyanine-4,4',4'',4'''-tetrasulfonic acid in 330 parts of chlorosulfonic acid 90.3 parts of thionylchloride are dropwise added at a temperature of 60–70° C. while stirring. Stirring is continued for 10 hours at 80–90° C. until a sample is insoluble in diethylamine water. Upon cooling the reaction mixture is poured on a mixture of ice and sodium salt solution. The precipitated sulfochloride is then filtered off with suction and washed with icewater until the filtrate shows neutral reaction. The neutral paste is added to a mixture of 38 parts of water, 15.2 parts of sodium bicarbonate and 19 parts of 1-amino-3-dimethylamino-propane, stirred for 12 hours at room temperature and for half an hour at 80° C. Upon addition of a small amount of sodium salt solution the dyestuff is sucked off and washed with water. It dissolves in dilute acetic acid with greenisih-blue color.

A similar dyestuff can be obtained when an equivalent amount of 1-diethylamino-4-n-pentane is used instead of the above 1-amino-3-dimethylamino-propane.

Example 12

10 parts of a copperphthalocyanine, which contains 3–4 chloromethyl groups, are dissolved in a mixture of 20 parts of 1-diethylamino-4-amino-n-pentane and 20 parts of water, and heated for about 15 hours to 90–95° C. Upon addition of water the precipitated dyestuff is filtered off and washed with water. It is dissolved in 1.5 liter of 3% acetic acid, filtered in the presence of active carbon, and recovered from the solution by addition of sodium hydroxide solution and filtration. It is soluable in dilute acetic acid with clear greenish-blue color.

Example 13

8.12 parts of cyanuric chloride are added to a solution of 4.76 parts of 1,4-diaminoanthraquinone in 80 parts of nitrobenzene and boiled for 10–15 minutes. Upon cooling the dyestuff formed is sucked off, washed with a mixture of methanol-pyridine (4:1), then with acetone and is dried. The chloride obtained is heated with 30 parts of 1-diethylamino-4-n-pentane in 150 parts of pyridine to 90–100° C. and the red dyestuff formed is precipitated by pouring this mixture into 300 parts of water. It is filtered off with suction and washed with water. The red dyestuff obtained in good yield dissolves readily in dilute acetic acid with red color.

Example 14

To 10 parts of 4-nitrophenyl-azo-β-naphthol having the formula

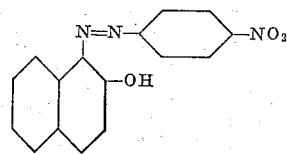

which is dissolved in 100 parts of chlorosulfonic acid, 4.05 parts of thionylchloride are added dropwise at 20° C. while stirring. Stirring is continued until the evolution of hydrochloric acid has stopped. The reaction mixture is then poured on ice, the precipitated sulfochloride of the above dyestuff is sucked off and washed with ice water until the filtrate shows neutral reaction. The paste obtained is added to 16.2 parts of 1-diethylamino-4-amino-n-pentane and stirred for 12 hours at room temperature and thereafter for one hour at 60° C. The precipitated basic dyestuff is sucked off and washed with water until the filtrate shows neutral reaction. The orange-yellow dyestuff obtained in very good yield is readily soluble in dilute acetic acid.

Example 15

5.14 parts of aniline-3-λ-dimethylaminopropylsulfamide (obtained by reacting nitrobenzene-3-sulfochloride with 1-amino-3-dimethylamino-propane and catalytic reduction of the nitro group in the presence of Raney nickel) are dissolved in a mixture of 50 parts of water and 1.24 parts of glacial acetic acid and diazotized by adding 15.6 parts of a 10% solution of sodium nitrite and 6.9 parts of concentrated hydrochloric acid at a temperature of 5° C.

The diazo solution thus obtained is slowly added to a mixture of 2.88 parts of β-naphthol, 1.78 parts of a 45% solution of sodium hydroxide, 22.7 parts of methanol and 14.4 parts of water in which 9.52 parts of crystallized sodium acetate have been dissolved.

The reaction mixture is stirred until coupling is finished. The precipitated dyestuff is washed with water and dried in vacuo. 7.2 parts of a dry basic dyestuff are obtained which readily dissolves in dilute acetic acid with clear orange color.

*Example 16*

A solution of 13.05 parts of 4-nitrobenz-5'-diethylamino-2'-pentylamide (obtained from 4-nitrobenzoylchloride and 1-diethylamino-4-amino-n-pentane) in 52 parts of water, 25.3 parts of glacial acetic acid and 41.6 parts of concentrated hydrochloric acid are reduced with 11.65 parts of 87.3% zinc dust in the presence of catalytic amounts of cuprous chloride solution of 0–5° C. while stirring. Thereafter the reaction mixture is filtered and the filtrate is diazotized with about 25 parts of a 10% solution of sodium nitrite at a temperature of 5° C. The solution of the diazonium salt thus obtained is slowly added to a solution of 6.5 parts of β-naphthol and 32 parts of pyridine, 74 parts of a 45% solution of sodium hydroxide and 234 parts of water while stirring. Stirring is continued for 2–3 hours and the precipitate then sucked off, washed with water and dried. The basic dyestuff is extracted from the precipitate with benzene and may be crystallized from this solution by concentrating it and upon addition of gasoline. It is sucked off, washed with gasoline and dried in vacuo. It dissolves in dilute acetic acid with orange color.

*Example 17*

31.6 parts of 1-diethylamino-4-amino-n-pentane dissolved in 59 parts of benzene are added to a solution of 26.15 parts of 4'-nitrodiphenyl-4-carboxylic acid chloride in 59 parts of benzene at a temperature of 20° C. while cooling and stirring. Stirring is continued for 2 hours at room temperature and the reaction mixture is thereafter smoothly boiled for one hour. Upon cooling to 5–10° C. a solution of 8.9 parts of 45% solution of sodium hydroxide in 134 parts of water are added thereto while stirring. Stirring is continued for some time. Thereafter the benzene layer is separated, washed twice or three times with cold water and extracted two or three times with a total of 45 parts of glacial acetic acid in 134 parts of water. The extract is filtered in the presence of activated carbon and the filtrate reduced by adding 23.1 parts of zinc dust (containing 87.3% of zinc) in small portions at a temperature of 0–5° C. An oily separation is dissolved again by addition of water. The reaction mixture is made soda-alkaline and stirred for some time. The precipitate is filtered off with suction, washed and dried. The product obtained is extracted with benzene, the cold extract filtered and the benzene evaporated. The residue is dissolved in hydrochloric acid and diazotized with a 10% solution of sodium nitrite at 0–5° C. The diazonium solution thus obtained is slowly added to a solution of 6.2 parts of β-naphthol in 34.5 parts of pyridine, 70.5 parts of a 45% solution of sodium hydroxide and 223 parts of water while stirring. Stirring is continued for some time and the precipitated dyestuff then sucked off, washed with water and dried in vacuo. It readily dissolves with clear yellowish-red color in dilute acetic acid.

*Example 18*

To 11.8 parts of a dioxazine dyestuff obtained from 3-amino-N-ethylcarbazol and chloranil, dissolved in 118 parts of chlorosulfonic acid 9.52 parts of thionylchloride are dropwise added at 20° C. while stirring. Stirring is continued for 24 hours at a temperature of 25–30° C. until a sample is readily soluble in a 10% solution of aqueous pyridine but insoluble in aqueous diethylamine. The reaction product is poured onto a mixture of ice and sodium salt solution, the precipitated sulfochloride filtered off and washed with icy dilute sodium salt solution until the filtrate shows a neutral reaction.

21.2 parts of 1-amino-2-diethylamino-ethane are added in small portions to the thus obtained paste of the sulfochloride which is mixed with a small amount of ice water. This mixture is stirred for 10–12 hours at room temperature and thereafter one more hour at 60° C. Upon addition of hot water the precipitated basic dyestuff is filtered off, washed with water and dried. Thus, 17.2 parts of a basic dyestuff are obtained which is soluble in dilute acetic acid with clear blue-violet color.

Similar products may be obtained by using 1-amino-3-dimethylamino-propane and 1-diethylamino-4-amino-n-pentane.

*Example 19*

11.9 parts of a copperphthalocyanine obtained from diphenylsulfon-3,4-dicarboxylic-acid-3'-sulfonic acid are dissolved in 56 parts of chlorosulfonic acid and reacted with 3.04 parts of thionylchloride while stirring for 2 hours at 80° C. To obtain the sulfochloride the reaction mixture is cooled and poured on ice. The precipitate is sucked off and washed with ice water until the filtrate shows a neutral reaction. The paste of the sulfochloride is mixed with a small amount of ice water and is then reacted with 8.15 parts of 1-amino-2-dimethylamino ethane. Upon stirring for 10–12 hours at room temperature the excess of 1-amino-2-dimethylamino ethane is blown out by steam distillation and the precipitated basic dyestuff filtered off and washed with hot water. It is obtained in good yield as a clear turquoise dyestuff which is readily soluble in acetic acid.

*Example 20*

5.87 parts of 4,4',4'',4''',5,5',5'',5'''-octaphenyl copperphthalocyanine are dissolved in 58.7 parts of chlorosulfonic acid and 7.15 parts of thionylchloride and stirred for 10–12 hours at room temperature. The sulfochloride is obtained as in the preceding examples by pouring the reaction mixture on ice, filtering off and washing.

The paste of the sulfochloride is mixed with a small amount of ice water and reacted with 10.5 parts of 1-amino-2-dimethylamino ethane following the procedure of Example 19.

A basic dyestuff of a clear green color is obtained in good yield which is readily soluble in dilute acetic acid.

*Example 21*

20 parts of a paste of copperphthalocyanine-(3)-di- and tri(β-chloroethyl)-sulfamide containing ~25% of the dyestuff are added to 40 parts of a 50% solution of dimethylamine. Upon addition of 6 parts of a 15% solution of sodium hydroxide the reaction mixture is stirred for 20 hours at room temperature. The reaction product formed is precipitated by heating for a short while and by addition of a solution of sodium acetate. It is filtered off with suction and washed. The dyestuff is obtained in nearly quantitative yield and is soluble in dilute acetic acid with clear blue color. By using a solution of diethylamine in the above example the corresponding diethylamine derivative is obtained.

The copperphthalocyanine-(3)-di- and tri(β-chloroethyl)-sulfamide can be obtained by the following procedure:

14.6 parts of the copperphthalocyanine-(3)-di- and trisulfochloride are suspended in 80 parts of water of 5–10° C. To this suspension 7 parts of chyroethylaminochlorohydrate dissolved in 10 parts of water are added while stirring. Stirring is continued for 4 hours while 39 parts of a 10% solution of sodium hydroxide are added and the temperature gradually rises to 18° C.

Thereafter stirring is continued for 20 hours at room temperature. The reaction product obtained in a quantitative yield is filtered off and washed.

Example 22

20 parts of a paste of copperphthalocyanine-(3)-di- and tri($\beta$-chloroethyl)-sulfamide containing 25% of the dyestuff are dissolved in 45 parts of a 50% solution of 1-amino-3-dimethylamino-propane. Upon addition of 6 parts of a 15% solution of sodium hydroxide the reaction mixture is stirred for 20 hours at room temperature. Thereafter a sodium salt solution is added and the dyestuff precipitated by adding hydrochloric acid until the solution becomes neutral. It is soluble in dilute acetic acid with clear blue color.

Example 23

20 parts of a paste of copperphthalocyanine-(3)-di- and tri($\beta,\gamma$-dibromopropyl)-sulfamide containing 25% of the dyestuff are dissolved in 40 parts of a $\sim$50% solution of dimethylamine. Then 9 parts of a 15% solution of sodium hydroxide are added and the reaction mixture is stirred for 20 hours at room temperature. Thereafter the excess of dimethylamine is blown out by steam distillation and the dyestuff precipitated by adding sodium salt solution (and eventually some hydrochloric acid). The reaction product obtained in excellent yield is readily soluble in acetic acid with clear blue color.

The above mentioned copperphthalocyanine-(3)-di- and tri($\beta,\gamma$-dibromopropyl)-sulfamide can be obtained as follows:

14.6 parts of copperphthalocyanine-(3)-di- and trisulfochloride are suspended in 50 parts of water of 5-10° C. To this suspension 19 parts of 2,3-dibromopropyl-amine-bromohydrate dissolved in 50 parts of water are added while stirring. Within 4 hours 4.2 parts of a 10% solution of sodium hydroxide are added while the temperature rises to 15° C. The reaction mixture is then stirred for another 20 hours. The reaction product obtained in an excellent yield is sucked off and washed.

Example 24

20 parts of a paste of tetraphenyl-copperphthalocyanine-tetra($\beta$-chloroethyl)-sulfamide containing 25% of the dyestuff are dissolved in 50 parts of a $\sim$50% solution of dimethylamine and stirred for 20 hours at room temperature. During this time one part of sodium hydroxide dissolved in a small amount of water is added. Thereafter the excess of dimethylamine is removed, and the dyestuff precipitated by adding sodium acetate solution. It is sucked off and washed. The basic dyestuff obtained in nearly quantitative yield is soluble in dilute acetic acid with clear green color.

The tetraphenyl-copperphthalocyanine-tetra($\beta$-chloroethyl)-sulfamide can be obtained as follows:

14.5 parts of tetraphenyl-copperphthalocyanine-tetrasulfochloride are suspended in 80 parts of ice/ice water and reacted with 7 parts of chloroethylamine-chlorohydrate dissolved in 10 parts of water at a temperature of 0-5° C. The mixture is stirred for one and a half hour at the same temperature while 4.2 parts of a 10% solution of sodium hydroxide are added. Stirring is then continued at a temperature of 20° C. until the reaction is finished. The dyestuff is sucked off and washed with water. The yield is quantitative.

Following the procedure of the above example a clear blue basic dyestuff may be obtained from copperphthalocyanine - (4) - tetra($\beta$-chloroethyl)-sulfamide (obtained from copperphthalocyanine-(4)-tetrasulfochloride and chloroethylamine).

Example 25

5 parts of copperphthalocyanine-(3)-di- and tri($\beta$-chloroethyl)-sulfamide are dissolved in 25 parts of diethanolamine and 20 parts of pyridine. Upon addition of one part of sodium hydroxide dissolved in 6 parts of water the reaction mixture is stirred for 20 hours at room temperature and then for 2 hours at 80-90° C. The basic dyestuff is precipitated by addition of sodium salt solution. It is obtained in good yield and dissolves in acetic acid with clear blue color.

Example 26

5 parts of the di-($\beta$-chloroethyl)-sulfamide of the dioxazine dyestuff obtained by the reaction of two mols of amino-N-ethylcarbazol and one mol of chloranil, are reacted with 80 parts of a 50% solution of dimethylamine while stirring for 24 hours at room temperature. The excess of dimethylamine is removed and the basic dyestuff precipitated by addition of a solution of sodium acetate, filtered off and washed. It is obtained in quantitative yield and is soluble in dilute acetic acid with clear violet color.

The above mentioned di($\beta$-chloroethyl)-sulfamide of the dioxazine dyestuff is obtained as follows:

16 parts of the disulfonylchloride of the dioxazine dyestuff are suspended in 100 parts of ice/ice water and reacted with 7.5 parts of chloroethylamine-hydrochloride dissolved in 10 parts of water at a temperature of 0-5° C. Within 2 hours 50 parts of a 10% solution of sodium hydroxide are added to the reaction mixture. Upon stirring for another 15 hours at room temperature the reaction product obtained in quantitative yield is sucked off and washed.

We claim:

1. A process for the production of a dyestuff of the general formula

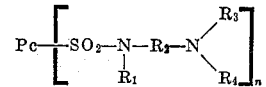

wherein Pc is a phthalocyanine radical, $R_1$ is a member selected from the group consisting of hydrogen and a lower alkyl radical, $R_2$ is a lower alkylene radical, $R_3$ and $R_4$ are monovalent radicals selected from the group consisting of lower alkyl and hydroxy lower alkyl and $n$ is an integer from 1 to 8, which comprises reacting a sulfochloride-substituted phthalocyanine dyestuff with an aliphatic tertiary amine of the general formula

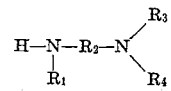

wherein $R_1$, $R_2$, $R_3$, and $R_4$ have the above meaning, and recovering the dyestuff formed.

2. The process as claimed in claim 1, in which the reaction is carried out in the presence of an acid binding agent.

3. The process as claimed in claim 1, in which the reaction is carried out in the presence of an inert diluent.

4. A basic dyestuff of the general formula

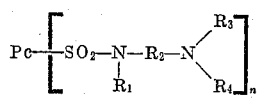

wherein Pc is a phthalocyanine radical, $R_1$ is a member selected from the group consisting of hydrogen and a lower alkyl radical, $R_2$ is a lower alkylene radical, $R_3$ and $R_4$ are monovalent radicals selected from the group consisting of lower alkyl and hydroxy lower alkyl and $n$ is an integer from 1-8.

5. A basic dyestuff of the general formula

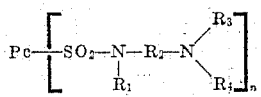

wherein Pc is the radical of a copperphthalocyanine, $R_1$ is a member selected from the group consisting of hydrogen and a lower alkyl radical, $R_2$ is a lower alkylene radical, $R_3$ and $R_4$ are monovalent radicals selected from the group consisting of lower alkyl and hydroxy lower alkyl and $n$ is an integer from 1–8.

6. A mixed dyestuff of the general formula

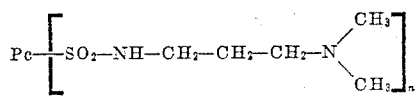

wherein Pc is the radical of a copperphthalocyanine, and $n$ is 2 and 3, the side chain being attached in the 3-position of the phthalocyanine molecule.

References Cited in the file of this patent

UNITED STATES PATENTS

| | | |
|---|---|---|
| 2,285,359 | Rosch et al. | June 2, 1942 |
| 2,414,050 | Linch | Jan. 7, 1947 |
| 2,416,387 | Haddock et al. | Feb. 25, 1947 |
| 2,479,491 | Haddock et al. | Aug. 16, 1949 |
| 2,542,328 | Haddock et al. | Feb. 20, 1951 |
| 2,744,914 | Rosch | May 8, 1956 |

FOREIGN PATENTS

| | | |
|---|---|---|
| 520,199 | Great Britain | Apr. 17, 1940 |
| 614,407 | Great Britain | Dec. 15, 1948 |

UNITED STATES PATENT OFFICE
CERTIFICATE OF CORRECTION

Patent No. 2,863,875                                          December 9, 1958

Berthold Bienert et al.

It is hereby certified that error appears in the printed specification of the above numbered patent requiring correction and that the said Letters Patent should read as corrected below.

Column 1, line 52, for "dydrogen" read -- hydrogen --; columns 1 and 2, Example 1, in the formula, center portion thereof, for "—CO=HC—" read -- —CH=CH— --; column 3, line 49, for "-nitrobenzene-" read -- -nitrobenzoyl- --; column 7, line 12, for "-nitrobenz-" read -- -nitrobenzoyl- --.

Signed and sealed this 2nd day of June 1959.

(SEAL)
Attest:

KARL H. AXLINE                                       ROBERT C. WATSON
Attesting Officer                                  Commissioner of Patents